United States Patent Office 3,416,899
Patented Dec. 17, 1968

3,416,899
GEL COMPOSITIONS AND PREPARATION
Sidney Schiff, Bartlesville, Okla., assignor to Phillips Petroleum Company, a corporation of Delaware
No Drawing. Filed Oct. 3, 1966, Ser. No. 583,943
7 Claims. (Cl. 44—7)

ABSTRACT OF THE DISCLOSURE

Preparation of gel compositions useful as incendiary fuels and the like by the hydrogenation of a hydrocarbon solution of an unsaturated rubbery polymer and a catalyst of a Group VIII metal salt and a reducing metal compound.

This invention relates to improved gel compositions useful as incendiary fuels, as solid fuels for heating, as a fracturing fluid for subterranean formations, and the like. In another aspect, this invention relates to the preparation of hydrocarbon gel compositions by hydrogenating a hydrocarbon solution of an unsaturated rubbery polymer in the presence of a catalyst comprising a reducing metal compound and a salt of a Group VIII metal.

The present invention is concerned with the preparation of gel compositions. Gelled hydrocarbon liquids suitable for various commercial applications are well known in the art. A formation of such gels, however, has usually required difficult compounding conditions. Hydrocarbon gel compositions are useful for a variety of purposes, including use as incendiary fuel compositions, as solid fuels for heating, as cleaning or paint removing compositions, or for use at oil well operations where formations are fractured by introducing a gelled fluid into the formation and applying pressure to the well head. Furthermore, improved napalm formulations are needed for the national defense.

In accordance with the present invention, it has been discovered that a jelled composition suitable for applications such as set forth above can be formed readily by hydrogenation of a hydrocarbon solution of an unsaturated rubbery polymer in the presence of a catalyst composition comprising a reducing metal compound, such as hydrocarbon aluminum, and a salt of a Group VIII metal.

Accordingly, an object of this invention is to provide improved gelled hydrocarbon compositions useful as incendiary compositions and the like.

A further object of this invention is to provide a method for economically producing gelled hydrocarbon compositions from readily available materials.

Other aspects, objects, as well as the several advantages of this invention will be apparent to those skilled in the art upon reading the specification and the appended claims.

According to the invention, a process for producing gelled compositions is provided which comprises contacting a mixture containing (a) a normally liquid hydrocarbon, (b) a hydrocarbon soluble unsaturated hydrocarbon polymer, (c) a Group VIII metal salt, and (d) a reducing metal compound with hydrogen under conditions and for a period of time until a gel of the desired characteristics is obtained.

The normally liquid hydrocarbons which can be gelled according to the invention include petroleum hydrocarbons such as naphthas, gasoline, kerosene, fuel oil distillates, and the like; pure hydrocarbons such as benzene, toluene, xylene, cyclohexane, and the like; and higher boiling hydrocarbon fractions that contain substantial amounts of lower boiling hydrocarbons such as mixtures of crude oils containing lighter petroleum fractions. The hydrocarbons should be free of materials that deleteriously affect the gelling process.

The unsaturated rubbery hydrocarbon soluble polymer employed in my invention can include relatively high molecular weight natural and synthetic elastomers that are highly unsaturated. Such polymers can include polybutadiene, polymers of substituted butadiene such as polydimethylbutadiene, polyisoprene, copolymers of butadiene or other hydrocarbyl dienes with each other or with vinyl substituted aromatic hydrocarbons such as styrene, and natural elastomers such as natural rubber. Mixtures of these or similar natural and/or synthetic unsaturated rubbery polymers can also be employed. Butadiene-styrene block copolymers with a molecular weight between 25,000 and 500,000 are preferred.

The monomers which can be employed in the preparation of the hydrocarbon soluble unsaturated polymers useful in the invention include a wide variety of materials. The preferred monomers are the conjugated dienes containing from 4 to 12 carbon atoms and preferably 4 to 8 carbon atoms, such as 1,3 - butadiene, isoprene, piperylene, methylpentadiene, phenylbutadiene, 3,4 - dimethyl - 1,3 - hexadiene, 4,5 - diethyl - 1,3 - octadiene, etc. In addition, conjugated dienes containing reactive substituents along the chain can also be employed, such as, for example, halogenated dienes, such as chloroprene, fluoroprene, etc. Of the conjugated dienes, the preferred material is butadiene, with isoprene and piperylene also being especially suitable. In addition to the conjugated dienes, other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethylvinyl group, such as 2 - vinylpyridine, 3 - vinylpyridine, 4 - vinylpyridine, 3 - ethyl-5 - vinylpyridine, 2 - methyl - 5 - vinylpyridine, 3,5-diethyl - 4 - vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4 - divinylpyridine, divinylbenzene, 2,3 - divinylpyridine, 3,5 - divinylpyridine, 2,4 - divinyl - 6 - methylpyridine, 2,3 - divinyl-5-ethylpyridine, and the like.

The unsaturated rubbery polymers, in addition to including homopolymers of polymerizable vinylidene compounds and copolymers of conjugated dienes with vinylidene compounds, also include block copolymers, which are formed by polymerizing a monomer onto the end of a polymer, the monomer being introduced in such a manner that substantially all of the coreacting molecules enter the polymer chain at this point. In general, the block copolymers can include combinations of homopolymers and copolymers of the materials hereinbefore set forth.

The unsaturated rubbery polymers useful in the invention can be prepared in any well known method according to the prior art.

The catalyst system which is used employs two components, one being a reducing metal compound which can be represented by the formula $MR_n$ wherein M represents a metal of Group I–A, II–A or III–A of the Periodic System as shown on page B–2 of the "Handbook of Chemistry and Physics," 45th edition, published by the Chemical Rubber Company, in 1964, $n$ is the valence of the metal M, and each R is hydrogen or a hydrocarbyl radical having 1 to 20 carbon atoms such as alkyl, cycloalkyl, aryl, or combinations thereof. Typical compounds representative of this component for the catalyst system include triisobutylaluminum, triethylaluminum, trieicosylaluminum, dicyclohexyl(phenyl)aluminum, 1-anthracenylpotassium, di - 3 - phenanthrylberyllium, n-butyllithium, dimethylmagnesium, di-n-propylbarium, tri-n-pentylgallium, diisobutylaluminum hydride, sodium hydride, aluminum hydride, and the like.

The second component of the catalyst system is a metal salt having the formula

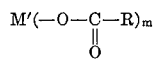

in which M' is a Group VIII metal; R has the same meaning as in the formula for the first component; and $m$ is the valence of M'. The second component is preferably a nickel salt. Typical compounds are nickel stearate, nickel acetate, nickel propionate, nickel formate, nickel octoate, nickel benzoate, nickel naphthenate, and the corresponding iron, cobalt, palladium, and platinum salts such as ferric stearate, cobalt naphthenate, cobalt octoate, and the like. Of this group, nickel stearate, nickel octoate, and nickel naphthenate are the presently preferred compounds.

It is preferred to use the nickel salts of organic acids having 5 to 20 carbon atoms, preferably, branched, because they are more readily soluble in the treating mixture. Salts of lower molecular weight acids, however, such as nickel acetate can be used and one method of improving the physical form of such materials for use in this process is to grind the nickel acetate with mineral oil to form a very fine slurry prior to combining it with the reducing metal compound.

The catalysts are prepared by mixing the components in a solvent, for example, the hydrocarbon solvent to be used for the treating medium. Catalyst poisons such as oxygen, water, or the like, should be avoided.

In carrying out the invention, the unsaturated rubbery polymer can be employed in an amount of from about 1 to 40 percent, preferably 5 to 20 percent, by weight based on the weight of the rubbery polymer and hydrocarbon solution. The Group VIII metal compound and reducing metal compound can be employed in such concentrations that the Group VIII and the reducing metal are present in concentrations of from 0.001 to 0.1, preferably 0.005 to 0.05, grams of each metal per 100 ml. of hydrocarbon.

As noted above, the Group VIII metal compounds and reducing metal compounds of this invention should be protected from contact with substances that will deleteriously react with them before hydrogenation. In like manner, the normally liquid hydrocarbon, the unsaturated rubbery polymer, and the equipment should also be free of such deleteriously reacting substances.

Hydrogenation, according to the invention, can be conducted in a conventional manner in conventional equipment utilizing continuous, semicontinuous, or batch techniques. In general, a mixture of the hydrocarbon, the Group VIII metal compound, the alkyl aluminum compound, and the polymeric substance is contacted with hydrogen gas or an otherwise substantially inert gas (to the said reaction) containing a substantial amount of hydrogen at a pressure that can be between 15 p.s.i.g. and 4,000 p.s.i.g., preferably between 200 p.s.i.g. and 800 p.s.i.g., and at a temperature that can be between 100° F and 1,000 F., preferably between 200° F. and 500° F., for a period of time sufficient to effect the degree of gelling desired, generally at least one minute or more, normally between ten minutes and 48 hours.

Example I

Five hundred ml. of 10 percent solution [weight of polymer (100)/wt. of solution] of 75/25 butadiene-styrene block polymer (mole weight approximately 100,000) in cyclohexane was charged to a reactor. Eight ml. of nickel octoate solution (0.0058 gm. nickel metal/ml. of the solution composed of nickel octoate in cyclohexane) and 15 ml. of triethylaluminum solution (0.0943 g. of triethylaluminum/ml. of the solution composed of triethylaluminum in cyclohexane) were then charged to the reactor under a nitrogen blanket after having been prepared and preserved under nitrogen. The contents of the reactor were then pressurized with hydrogen for 3½ hours at 350° F. and 400 p.s.i.g. $H_2$ after the nitrogen had been flushed from the system. The product, upon cooling, gelled to a napalm-type material. The product, upon ignition, burned with vigor and retained a substantially gel form.

Example II

The run of Example I was repeated except that 400 p.s.i.g. of $N_2$ rather than $H_2$ was pressured to the reactor. No gel was formed. No structural changes were noted by infrared analysis.

These examples clearly demonstrate that hydrogenation of an unsaturated rubbery hydrocarbon soluble polymer in the presence of a hydrocarbon liquid, an organo Group VIII metal compound, and an alkyl aluminum compound produces a jellied composition useful as an incendiary.

Reasonable variation and modification are possible within the scope of the foregoing disclosure and the appended claims to the invention, the essence of which is that napalm-type compositions are prepared by the hydrogenation of a mixture of (1) a normally liquid hydrocarbon, (2) an unsaturated rubbery hydrocarbon soluble polymer, and (3) a two-component catalyst system of an organo Group VIII metal compound, e.g., nickel octoate and a reducing metal compound, preferably an alkyl aluminum compound, e.g., triethylaluminum.

I claim:

1. A process for the production of gel compositions which comprises contacting a mixture containing:
    (a) a normally liquid hydrocarbon,
    (b) a hydrocarbon soluble unsaturated rubbery polymer selected from relatively high molecular weight natural and synthetic elastomers that are highly unsaturated,
    (c) a Group VIII metal salt having the formula

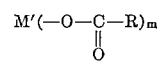

in which M' is a Group VIII metal, R is hydrogen or a hydrocarbyl radical having 1 to 20 carbon atoms, and $m$ is the valence of M', and
    (d) a reducing metal compound having the formula $MR_n$ wherein M is a metal of Group I-A, II-A or III-A of the Periodic System, $n$ is a valence of the metal M, and each R is hydrogen or a hydrocarbyl radical having 1 to 20 carbon atoms, with hydrogen under conditions and for a period of time until a gel of the desired characteristics is obtained.

2. A process according to claim 1 wherein the amount of said unsaturated rubbery polymer ranges from 1 to 40 weight percent based on the total amount of (a) and (b).

3. The process of claim 1 wherein (b) is selected from homopolymers of vinylidene compounds and copolymers of conjugated dienes of 4 to 12 carbon atoms per molecule with vinylidene compounds copolymerizable therewith.

4. A process according to claim 1 wherein (c) is a Group VIII metal salt of an alkanoic acid and (d) is an alkyl aluminum compound.

5. The process of claim 4 wherein the conecentrations of (d) and (c) in said mixture ranges from 0.001 to 0.1 gram of each metal per 100 ml. of normally liquid hydrocarbon.

6. A process according to claim 5 wherein the hydrogenation temperature ranges from 100 to 1000° F., the hydrogenation pressure ranges from 200 to 800 p.s.i.g., and the hydrogenation contact time ranges from about 1 minute to 48 hours.

7. A process according to claim 6 wherein (a) is cyclohexane, (b) is a 75/25 butadiene-styrene block polymer, (c) is nickel octoate, and (d) is triethyl aluminum.

References Cited

UNITED STATES PATENTS

| | | | |
|---|---|---|---|
| 2,927,849 | 3/1960 | Greblick et al. | 44—62 |
| 2,966,401 | 12/1960 | Myerholtz | 44—7 |
| 3,151,181 | 9/1964 | Hewitt et al. | 44—7 XR |
| 3,205,278 | 9/1965 | Lapporte | 252—431 XR |
| 3,243,270 | 3/1966 | Flanagan | 44—7 |
| 3,257,332 | 6/1966 | Ziegler et al. | 252—431 XR |

DANIEL E. WYMAN, *Primary Examiner.*

C. F. DEES, *Assistant Examiner.*

U.S. Cl. X.R.

252—8.55